(12) United States Patent
Verscharen

(10) Patent No.: US 7,282,081 B2
(45) Date of Patent: Oct. 16, 2007

(54) METHOD AND APPARATUS FOR HIGH EFFICIENCY MULTI-STAGE PACKED TOWER AERATION WITH PH ADJUSTMENT AND REUTILIZATION OF OUTLET AIR

(76) Inventor: John A. Verscharen, 22607 S. Shore Dr., Land O'Lakes, FL (US) 34639

( * ) Notice: Subject to any disclaimer, the term of this patent is extended or adjusted under 35 U.S.C. 154(b) by 298 days.

(21) Appl. No.: 10/960,446

(22) Filed: Oct. 6, 2004

(65) Prior Publication Data

US 2006/0032375 A1 Feb. 16, 2006

Related U.S. Application Data

(60) Provisional application No. 60/601,761, filed on Aug. 12, 2004, provisional application No. 60/601,760, filed on Aug. 12, 2004.

(51) Int. Cl.
*B01D 19/00* (2006.01)
(52) U.S. Cl. .................. 95/9; 95/245; 95/258; 96/189; 96/202; 96/156
(58) Field of Classification Search .................. 95/9, 95/245, 258, 263, 159, 170; 96/188, 202, 96/203, 156, 189; 210/188, 96.1, 743, 806; 261/95
See application file for complete search history.

(56) References Cited

U.S. PATENT DOCUMENTS

| 927,278 | A | * | 7/1909 | Pfeiffer, Jr. .................. 261/95 |
|---|---|---|---|---|
| 3,387,431 | A | * | 6/1968 | Siebert .......................... 95/136 |
| 4,526,692 | A | | 7/1985 | Yohe et al. |
| 5,236,557 | A | * | 8/1993 | Muller et al. .................. 203/10 |
| 5,296,205 | A | | 3/1994 | Hardison |
| 5,378,267 | A | | 1/1995 | Bros et al. |
| 5,876,662 | A | | 3/1999 | Jain |
| 6,080,306 | A | | 6/2000 | Falkner |
| 6,110,385 | A | * | 8/2000 | Copa et al. .................. 210/743 |
| 6,773,582 | B2 | | 8/2004 | Anthony |
| 2005/0244313 | A1 | * | 11/2005 | Petrik .......................... 422/211 |

OTHER PUBLICATIONS

Steven J. Duranceau, Robert Anderson, and Robert Teegarden, Comparison of Mineral Acid Pretreatments for Sulfide Removal, May 1999.

* cited by examiner

*Primary Examiner*—Duane Smith
*Assistant Examiner*—Douglas J Theisen
(74) *Attorney, Agent, or Firm*—Holland & Knight LLP

(57) ABSTRACT

Disclosed is an improve aeration system. The aeration system of the present invention more efficiently removes contaminates, such as hydrogen sulfide, from water. The increased efficiency is achieved by adjusting the pH level of the water in between sequential mass transfer media stages within the aerator. The present invention also relates to an aeration system wherein the forced or induced air is used to strip contaminants from the processed water is reutilized by one or more aeration towers connected in series.

15 Claims, 5 Drawing Sheets

$a = CO_3^=$, OR BOUND $CO_2$

US 7,282,081 B2

METHOD AND APPARATUS FOR HIGH EFFICIENCY MULTI-STAGE PACKED TOWER AERATION WITH PH ADJUSTMENT AND REUTILIZATION OF OUTLET AIR

RELATED APPLICATION DATA

This application claims priority from provisional application Ser. No. 60/601,761 filed on Aug. 12, 2004 and entitled High Efficiency Aeration with Intertower PH Adjustment and from provisional application Ser. No. 60/601,760 filed on Aug. 12, 2004 and entitled Reutilization of Process Air from a Packed Tower Aerator to Minimize Outlet Air Quantity and Offgas Air Treatment Size. The contents of both these applications are incorporated herein by reference.

BACKGROUND OF THE INVENTION

1. Field of the Invention

This invention relates to packed tower aerators. More particularly, the present invention relates to packed tower aerators that are staged to improve decontamination efficiency and minimize outlet air.

2. Description of the Background Art

Hydrogen sulfide is a common water contaminant that is easily identified by its rotten egg order. It is most commonly the result of sulfur bacteria that uses natural sulfur compounds as a food source. Hydrogen sulfide contamination is typically found in water with low levels of dissolved oxygen and pH level of less than 6.5. Although it is an impurity, it does not pose a healthy risk at the levels most commonly found in driking water. Nonetheless, hydrogen sulfide gives water a noxious order and objectionable taste.

Currently, there exists a variety of methods to remove hydrogen sulfide contamination from water. These methods include chemical treatments, filtration techniques and aeration. Aeration involves the "stripping" of hydrogen sulfide by forcing a volume of air through the contaminated water. The stripping is achieved within a volume of mass transfer media that facilitates water-air interaction. The forced air dissolves the hydrogen sulfide within the water and removes the contamination as a volatile gas. The contaminant laden air must thereafter be collected and treated to control odors, as local government agencies often regulate the purity of air discharged to the environment.

The background art contains numerous examples devices for stripping contaminants from water. For instance, U.S. Pat. No. 5,378,267 to Bros et. al. discloses a modular air stripping apparatus. The apparatus includes a stacked series of intermediate stripping chambers for use in removing volatile organic compounds from water. Air flows upwardly through the chambers wherein it flows through water passing over the floors of the chambers.

U.S. Pat. No. 5,876,662 to Jain discloses an odor control system for removing hydrogen sulfide from a gas stream. The system employs a boxlike housing that contains three sequentially connected treatment chambers. The treatment chambers each contain a suitable packing wherein chemical reactions occur based on mass transport principles.

Another hydrogen sulfide removal apparatus is disclosed in U.S. Pat. No. 6,080,306 to Falkner. The apparatus of Falkner discloses an apparatus that causes sufficient oxygen to be dissolved in water for a sufficient amount of time and at a sufficient pressure such that solid elemental sulfur is precipitated.

Finally, U.S. Pat. No. 6,773,582 to Anthony discloses a drinking water treatment system that includes hydrogen sulfide scrubbers for treating hydrogen sulfide gas flow from an aerator. The scrubbers employ scrubbing solutions that include a triazine compound.

Although each of the above referenced inventions achieves its individual objective, they all suffer from common problems. For instance, prior aerators require large volumes of mass transfer media in order to adequately clean contaminants from the water supply. In the case of hydrogen sulfide contaminants, the volume of media necessary to achieve suitable purity must be housed in an aeration tower at least 10 to 14 feet high. This results in towers that are unsightly, difficult to service, and expensive.

Additionally, prior aeration systems all require elaborate odor control systems for the outlet air. These odor control systems are often mandated by governmental agencies to prevent the escape of noxious smelling orders. The requirement of odor control systems for packed aeration towers adds greatly to the cost of such towers.

Thus, there exists a need in the art for a packed tower aerator that removes contaminants in a more efficient manner, thereby reducing the volume of mass transfer media needed and the size of the tower housing such media. There further exists a need in the art for a packed tower aerator that reutilizes the outlet air thereby minimizing the size of odor control systems.

SUMMARY OF THE INVENTION

It is therefore one of the objectives of this invention to more efficiently remove contaminants from water in a packed tower aerator.

It is also an object of this invention to utilize lesser volumes of mass transfer media in the scrubbing of contaminated water.

Still another object of this invention is to create a packed tower aerator with a more compact design.

Another object of this invention is to minimize the size of odor control systems in packed tower aeration systems.

A further object of this invention is the reutilization of outlet gases in the stripping of contaminants from water.

These and other objectives are accomplished via a method for efficiently removing hydrogen sulfide from a water supply. The method involves spraying water contaminated with hydrogen sulfide over a first mass transfer media stage, whereby the water is brought into contact with the transfer media. At the same time, air is forced through the first mass transfer media stage such that the forced air comes into contact with the water. The resulting air-water contact causes hydrogen sulfide within the water to be transferred to the forced air. The water is then collected after it passes through the first mass transfer media stage.

Next, the pH level of the collected water is measured and the acidity of the water is increased if the measured pH level is above 6.5. This water is then sprayed over a second mass transfer media stage, whereby the water is again brought into contact with a transfer media. Air is forced through the second mass transfer media stage such that the forced air comes into contact with the water. Again, the air-water contact causes hydrogen sulfide within the water to be transferred to the forced air. The forced air is then gathered and processed with an air treatment system to improve the air quality. Finally, the purified water is collected after it passes through the second mass transfer media stage.

Still other objectives of the present invention are achieved by providing a method for reutilizing process air in a packed tower aeration system. The method involves providing a first packed tower aerator with an air inlet and outlet and a water inlet and outlet and a first mass transfer media stage. Contaminated water is sprayed from the water inlet over the first mass transfer media stage, whereby the water is brought into contact with the transfer media. Air is forced from the air inlet through the first mass transfer media stage such that the forced air comes into contact with the water. The air-water contact causes contaminants within the water to be transferred to the forced air. Thereafter, the forced air is gathered and directed through the outlet in the first tower.

In accordance with this method, second, third or fourth packed tower aerators can also be provided, with the second tower likewise having an air inlet and outlet and a water inlet and outlet and a second mass transfer media stage. Air from the outlet of the first packed tower aerator is directed to the inlet of the second packed tower aerator. Thereafter, the air within the second tower is directed through the second mass transfer media stage. The outlet of the second tower can then be used within the third tower and so on.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to an improved aeration system. The aeration system of the present invention more efficiently removes contaminants, such as hydrogen sulfide, from water. The increased efficiency is achieved by adjusting the pH level of the water in between sequential mass transfer media stages within the aerator. The present invention also relates to an aeration system wherein the forced air used to strip contaminants from the processed water is reutilized by one or more aeration towers connected in series. The details of the present invention will be described in greater detail hereinafter.

Multi-Stage Aerator with pH Adjustment

Figure 1:
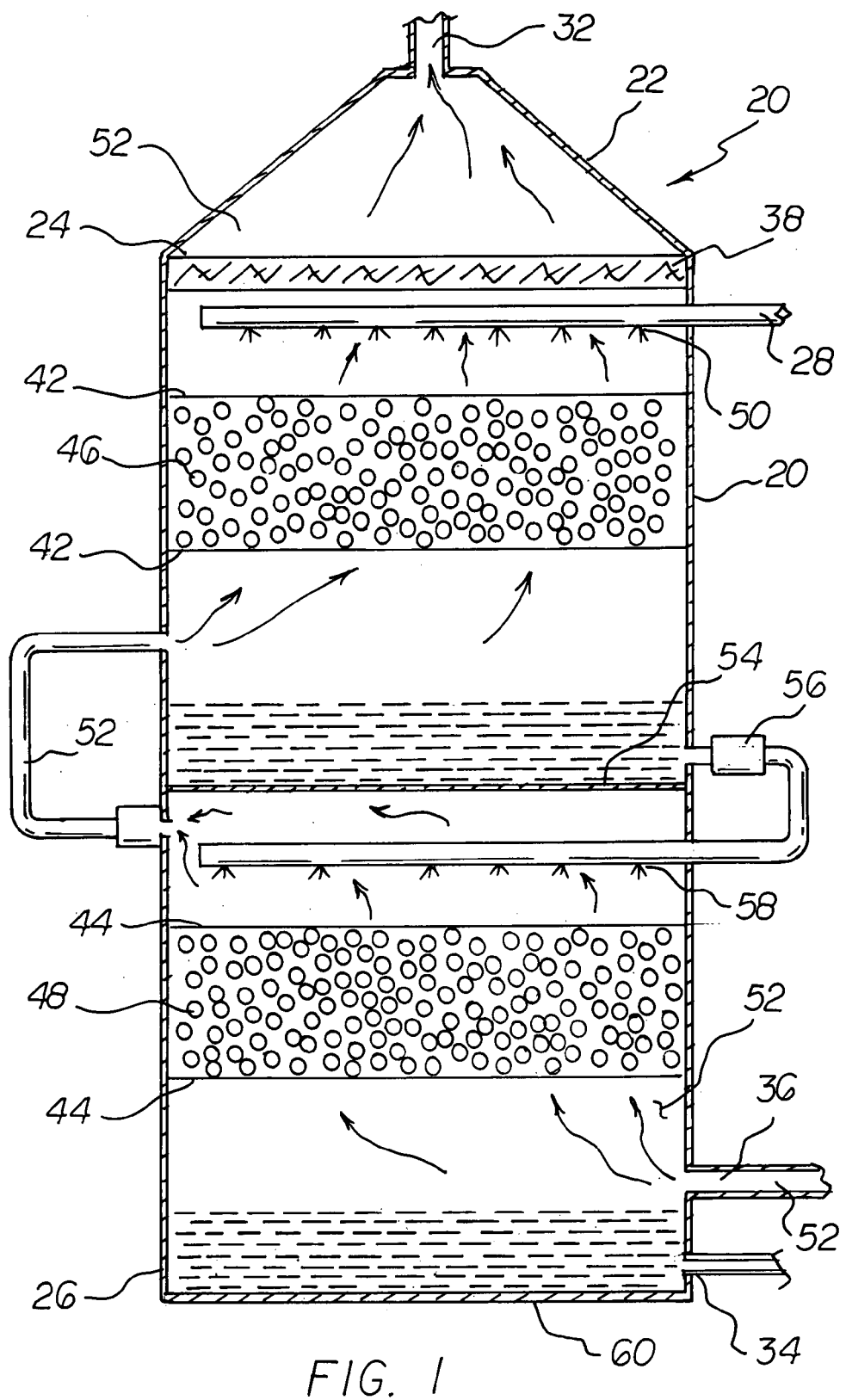
FIG. 1 is a cross sectional view of the packed tower aerator constructed in accordance with the principles of the present invention.

With reference to the cross-sectional view of FIG. 1, one embodiment of the packed tower aerator 20 of the present invention is depicted. As illustrated, aerator 20 includes a housing 22 with upper and lower extents (24 and 26, respectively). Although the present aerator is illustrated as having a cylindrical configuration, other housing configurations can also be employed to carry out the principles of the present invention.

Housing 22 includes both a water inlet 28 and an air outlet 32 at its upper extent 24. Water inlet 28 is from a supply of contaminated water, such as from an underground well water treatment plant or spring. In the preferred embodiment, outlet 32 is at the very top of housing 22, at the peak of a conical roof. As can be appreciated, the conical configuration of the roof functions in gathering air as it is forced upwardly through housing 22 and directs it to outlet 32.

Housing 22 further includes a water outlet 34 and an air inlet 36 at its lower extent 26. Water outlet 34 allows purified water to escape from the interior of the aerator 20 after contaminants are removed. Air inlet 36 allows ambient air to be delivered to the interior components of aerator 20 in a manner described in greater detail hereinafter. Air inlet 36 may be operatively coupled to an air compressor, fan or blower (not shown) for pressurizing the air delivered to the interior of housing 22. Ideally, the compressor, fan or blower is strong enough to sufficiently pressurize the air to enable it to travel upwardly through housing 22 and out through outlet 32. The air compressor, fan or blower may also be coupled on the down stream side of the discharge 32 to pull or induce air through the tower. The housing 22 also preferably includes a mist eliminator 38 at the upper extent 24 to remove moisture from the expelled air. The mist eliminator 38 can come in the form of random dumped media, chevron media or a nest pad.

With continuing reference to FIG. 1, housing 22 further contains first and second pairs of grated supports (42 and 44, respectively), with the first grated supports 42 being positioned adjacent to the upper extent 24 of housing 22 at a location slightly below water inlet 28. The second pair of grated supports 44 are located adjacent to the lower extent 26 of housing 22. In the preferred embodiment, both pairs of supports have an identical construction and are formed from dividers that serve to segment the interior of housing 22. The dividers, however, are apertured and contain a number of through holes that permit the free passage of water and air throughout the interior of housing 22.

Nonetheless, the apertures within the supports (42 and 44) are small enough to prevent the passage of larger objects. This allows the supports (42 and 44) to be employed in retaining a volume of mass transfer media. That is, a first volume of mass transfer media 46 is positioned intermediate the first pair of grated supports 42 and a second volume of mass transfer media 48 is positioned intermediate the second pair of supports 44.

Mass transfer media is a term used in the art to describe a packing material that facilitates liquid aeration. Specifically, mass transfer media is used to promote interaction between the contaminated water and forced or induced air and, thereby, permit the water to be aerated by the forced or induced air. In the preferred embodiment, the mass transfer media takes the form of a number of hollow spheres constructed from plastic polyethylene or polypropylene. The spheres are sprayed by the contaminated water to increase the surface area of the water coming into contact with the forced air. Ideally, the spheres have a diameter such that they do not become too tightly packed between the grated supports. This loose packing of the spheres allows air to easily flow through the mass transfer media where it comes into contact with the sprayed water. One suitable mass transfer media is made by Jaeger Products, Inc. of Houston, Tex. under the trade name Tri-Packs®. However, those skilled in the art will no doubt be aware of other suitable mass transfer materials.

FIG. 1 further illustrates the series of liquid distribution nozzles 50 that are positioned above the first pair of grated supports 42. Those skilled in the art will appreciate that other systems, such as a weir through distributor, can be employed in place of distribution nozzles. Accordingly, the nozzles depicted in the figures will be generally referred to as a distribution system. Distribution system 50 is connected to the pipe of water inlet 28. The distribution system 50 functions in spraying contaminated water over the first volume of mass transfer media 46. In order to achieve an adequate distribution of the water, a pump (not shown) may be included to pressurize the water being treated. Once the water is sprayed from distribution system 50, it passes through the grates in the upper support 42 and is gravity fed through the first volume of transfer media 46 and then through the grates in the lower support 42.

At the same time the water is circuitously navigating the mass transfer media, air is forced up through the bottom of the grated supports 42 along an air channel 52. This forced air is brought into contact with the mass transfer media and the water contained therein. The water-air contact aerates the contaminated water causing the hydrogen to be stripped and carried away by the air.

Figure 2:
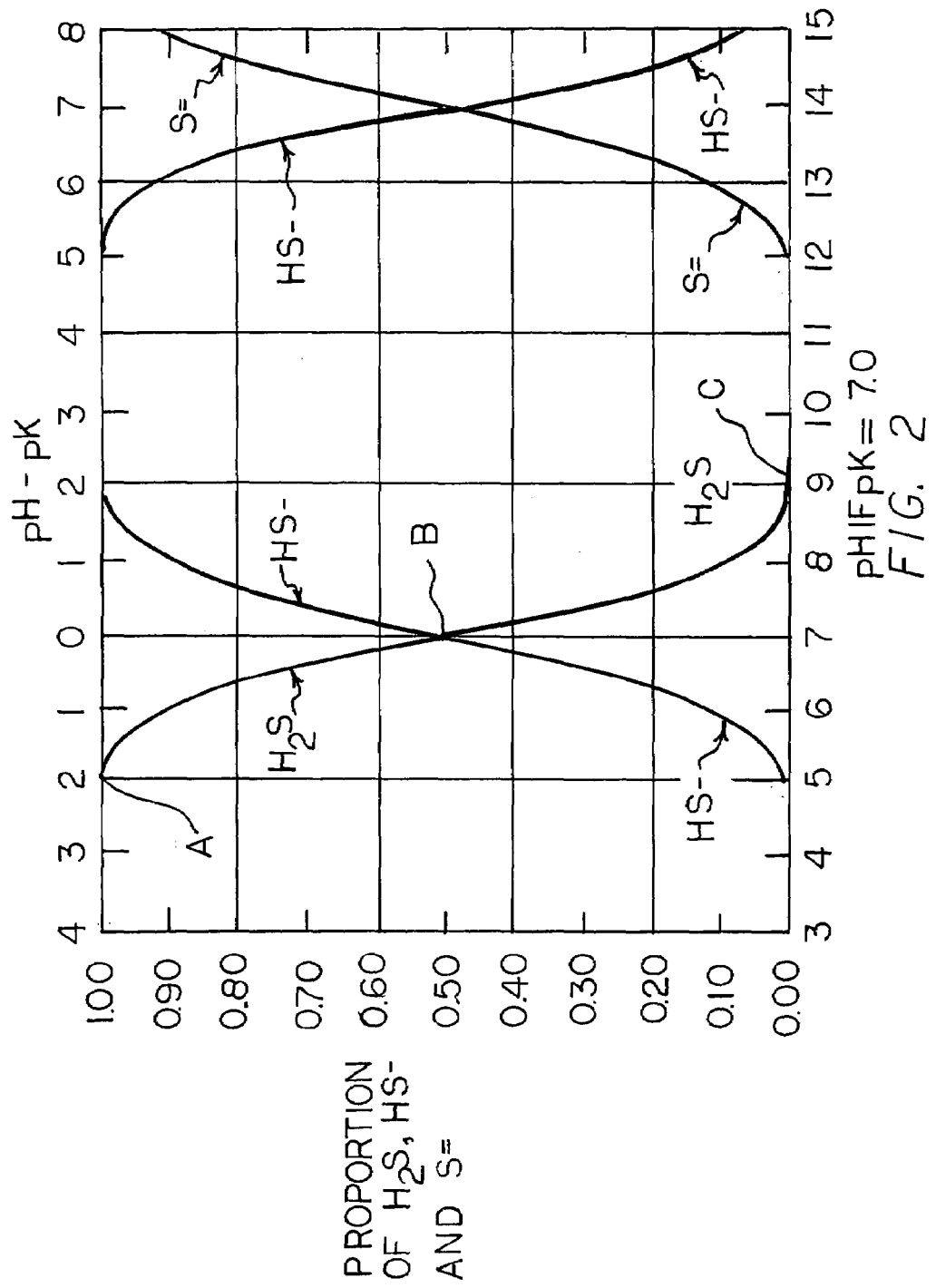
FIG. 2 is a graph illustrating the distribution of total sulfides in water.

Here, it should be noted that the sulfide stripped from the water is in the form of an entrained Hydrogen Sulfide ($H_2S$) gas. The graph included as FIG. 2 illustrates the distribution of total sulfides in water. The intersecting lines on the left hand side of the graph illustrate that total sulfides are comprised of the bisulfide ion ($HS^+$) and Hydrogen Sulfide ($H_2S$). The difference between $H_2S$ and $HS^-$ is important because only $H_2S$, as a volatile gas, and can be removed via aeration. FIG. 2 also illustrates the distribution of $HS^-$ and $H_2S$ species as a function of pH. The percentage of $H_2S$ species decreases from 100% at point "A," to 50% at point "B" and then 0% at point "C." The percentage of $HS^-$ varies in an inverse proportion. Thus, as pH increases, the proportion of $H_2S$ decreases and aeration becomes more difficult and less efficient.

To compensate for the foregoing, the present invention provides a pH adjustment after the first stage of aeration as is described more fully hereinafter. FIG. 1 illustrates tray 54 that serves to collect the water after it passes through the mass transfer media 46. To accomplish this, unlike the grates (42 and 44), tray 54 is not apertured. Over time, a pool of partially treated water collects upon first tray 54. At this point, the first stage of aeration is complete. Nevertheless, water within first tray 54 will most likely still contain unacceptable levels of hydrogen sulfide. This is because the volume of mass transfer media in the first stage 46 is insufficient to adequately scrub the treated water.

The partial treatment of the water is the result of carbon dioxide being removed from the water and transferred to the air along with hydrogen sulfide during aeration. The loss of carbon dioxide results in the water becoming more alkaline and the pH level increasing. As noted in FIG. 2, this results in a decrease in aeration efficiency. The relationship between carbon dioxide and pH is illustrated in the graph of FIG. 3.

Figure 3:
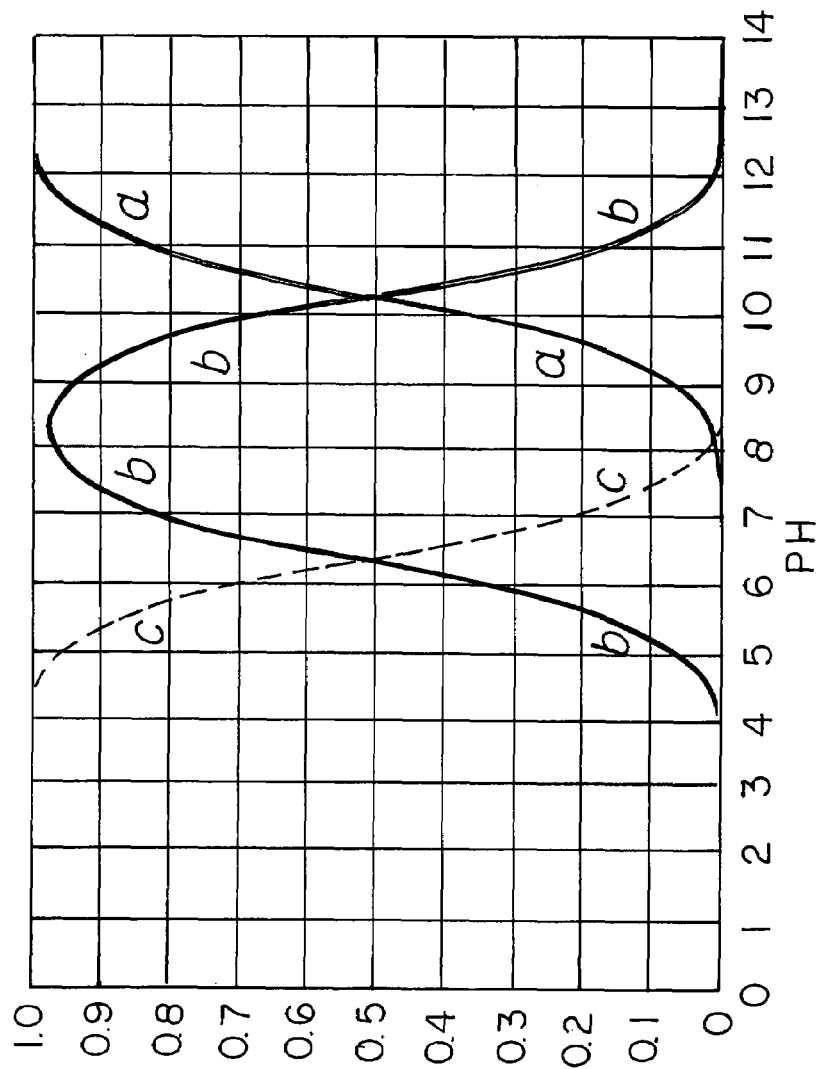
FIG. 3 is a graph illustrating the distribution of carbon dioxide in water.

Specifically, the graph of FIG. 3 illustrates the relationship between the bicarbonate ion $HCO_3-$ (also known as half-bound $CO_2$) and carbonic acid ($H_2CO_3$)/carbon dioxide gas ($CO_2$) as a function of pH. Line "C" depicts the percentage of $H_2CO_3/CO_2$ while line "b" represents the percentage of $HCO_3-$. For example, at the intersection of lines "b" and "c" the relative percentages are 50-50. The graph reflects the fact that carbon dioxide is most easily removed from water at a lower pH. Stated differently, pH increases as $CO_2$ gas is removed from water.

This increase in pH is significant because pilot studies have demonstrated a link between the pH of water and the ability to efficiently strip hydrogen sulfide via aeration. More specifically, studies show that the most efficient aeration occurs when water has a pH of between 6 and 6.5. As a consequence, as water makes its way through the first mass transfer media 46, it loses carbon dioxide and increases in pH, resulting in a dramatic drop in aeration efficiency. The inventor of the present invention has discovered that 70-90% of Hydrogen Sulfide contamination is removed within the first 2-4 feet of aeration, prior to a substantial increase in pH. The remaining aeration is then carried out over the next 10-12 feet due to increased pH and the corresponding efficiency loss.

The packed tower aerator 20 of the present invention overcomes this problem by collecting water at tray 54, after it has been partially treated by a smaller volume of mass transfer media. In the preferred embodiment, the mass transfer media 46 in the first stage is between 2-4 feet in length. After passing through this compacted aeration stage, the partially treated water is pooled upon first tray 54 within housing 22. A pH sensor 56 is operatively connected to distributor 58. In the preferred embodiment, the water is routed through piping that allows the pH level of the water to be detected. If the pH level is determined to be above the pH required for removal, a solution is then added to increase the acidity of the water and decrease the pH, with the aim of bringing the total pH into the range of 6 and 6.5 or lower. This adjustment facilitates more efficient aeration in subsequent steps.

After the pH adjustment, the partially processed water is again routed to a liquid distribution system 58. As noted in FIG. 1, distributor 58 is positioned above the second pair of grated supports 44. Distribution system 58 is coupled to the first water tray 54 via piping and functions in spraying water from the water tray 54 over the second volume of mass transfer media 48.

Second mass transfer media stage 48 works in the same manner as described above in conjunction with the first stage. That is, the water from nozzles 58 is sprayed over grated supports 44. The water is then gravity fed through supports 44 and over transfer media 48. Again, this transfer media is about 2-4 feet in length. At the same time, forced air from the air inlet 36 is directed upwardly along air channel 52, and through transfer media 48, to aerate the water and strip it of any contaminants. After air is passed through the second volume of media 48, air channel 52 continues via piping to deliver the air to the underside of the first volume of media 46.

The water is then passed from the bottom of the grated support 44 and is collected by a second water tray 60. The water collected by second tray 60 is fully treated and ready for use.

It should be apparent to those skilled in the art that the present invention is not limited to the use of a tower with only two mass media stages. Rather, beneficial results can be achieved by including more than two stages. The invention resides in the adjustment of pH between mass media stages to facilitate the efficient removal of contaminants, such as hydrogen sulfide, from water. The principles of the present invention can easily be carried out with two or more stages. Additionally, although the stages are depicted as being vertically arranged, they could readily be staged horizontally in series. Furthermore, the invention could also be used to remove other volatile organic chemicals from water or other fluids.

Figure 4:
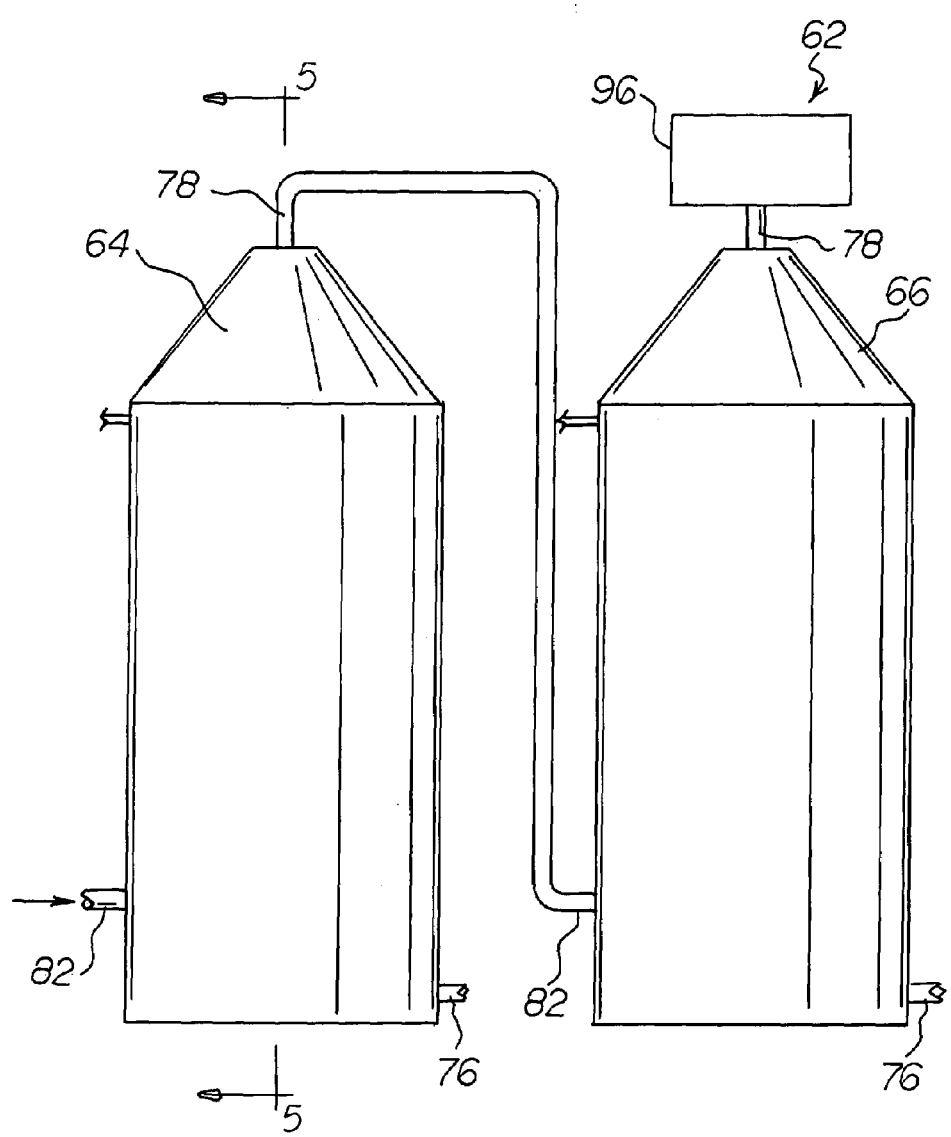
FIG. 4 is a view of an alternative aeration system of the present invention.
Figure 5:
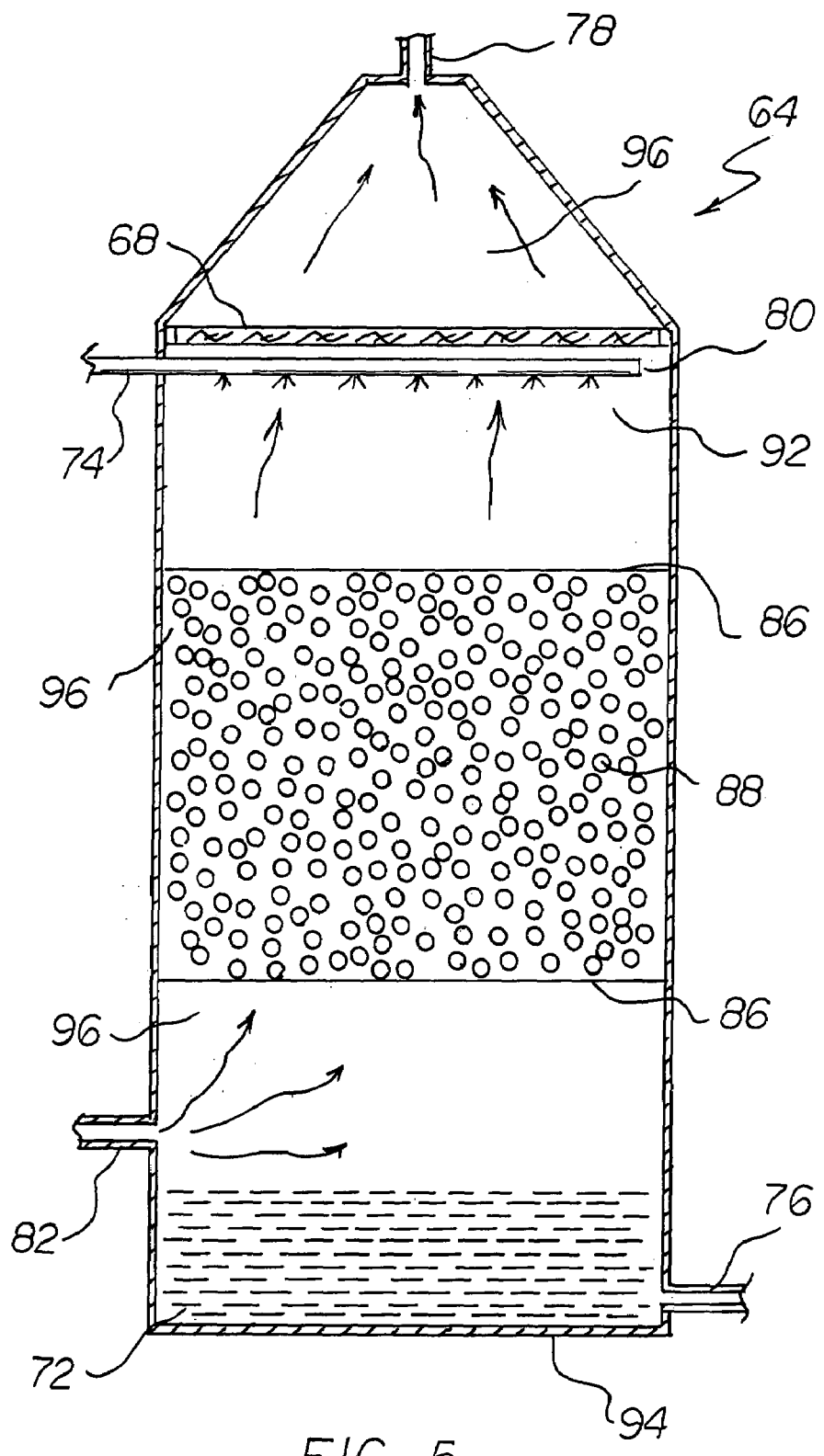
FIG. 5 is a cross sectional view of one of the aeration towers taken along line 5-5 of FIG. 4.

FIGS. 4 and 5 illustrate a stacked tower aeration system 62 that is designed to permit the reutilization of outlet air. As is most clearly illustrated in FIG. 4, system 62 includes first and second housings (64 and 66) that are connected in series to one another.

In the preferred embodiment, housings 64 and 66 are formed from a similar construction, so only one will be described in detail. FIG. 5 illustrates first housing 64 as having upper and lower extents (68 and 72, respectively). A water inlet 74 and an air outlet 78 are included at the upper extent 68 of housing 64 and a water outlet 76 and an air inlet 82 are included at the lower extent 72. As noted above in conjunction with FIG. 1, a mist eliminator 80 can also be included at upper extent 68.

A pair of grated supports 86 are positioned within the interior of first housing 64, with a volume of mass transfer media 88 being positioned there between. As also described in FIG. 1, water inlet 74 includes a series of liquid distribution nozzles 92 that are positioned above grated supports 86, with nozzles 92 functioning to spray water from the inlet 74 over the volume of mass transfer media 88.

FIG. 5 further illustrates a tray 94 positioned beneath grated supports 86 for use in collecting the water after is passes through mass transfer media 88. Tray 94 also functions in routing the collected water to water outlet 76. Housing 64 further includes an air channel 96 that allows forced air to travel from the bottom of the housing, through grated support 86, mass transfer media 88 and through air outlet 78 at the top of housing 64. Thus, the housing of FIG. 5 as described above is identical to the housing described in conjunction with FIG. 1, except for the notable difference that the housing of FIG. 5 has only one stage. Nonetheless, it will be appreciated by those skilled in the art that a multiple stage aeration tower could readily be employed in aeration system 62.

The present system differs from the aerator of FIG. 1 in that it includes second housing 66 that is connected in series with first housing 64. As noted by FIG. 4, the air outlet 78 of first tower 64 is connected to the air inlet 82 of second tower 66. This series interconnection means that a new air supply is not needed for second tower 66. Additionally, there is no need for an odor control system 96 at outlet 78 of first tower 64. Rather, the air leaving first tower 64, which is contaminated with hydrogen sulfide, is used as the forced air in second tower 66. If needed, a compressor, fan or blower can be included to pressurize the air prior to introducing it into the second tower. It has been discovered that reusing discharge air for subsequent aeration does not adversely affect the efficient removal of contaminants from water. Reutilizing outlet air in this matter reduces the total volume of outlet air produced. For example, if two aerators are used in series the total air outlet is reduced by half. If three aerators are connected in series, the total air outlet is reduced by a third. This dramatically reduces the size of control systems to process the discharged air.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method of efficiently removing hydrogen sulfide from a water supply, the method employing multiple mass transfer media stages and comprising the following steps:

spraying water contaminated with hydrogen sulfide over a first mass transfer media stage whereby the water is brought into contact with the transfer media;

forcing air through the first mass transfer media stage such that the forced air comes into contact with the water, the air-water contact causing hydrogen sulfide within the water to be transferred to the forced air;

collecting the water after it passes through the first mass transfer media stage;

measuring the pH level of the collected water and increasing the acidity if the measured pH level is above a determined amount;

spraying the water over a second mass transfer media stage whereby the water is brought into contact with the transfer media;

forcing air through the second mass transfer media stage such that the forced air comes into contact with the water, the air-water contact causing hydrogen sulfide within the water to be transferred to the forced air;

gathering the forced air and processing it with an air treatment system to improve the air quality;

collecting the water after it passes through the second mass transfer media stage.

2. A method for reutilizing process air in a packed tower aeration system, the method comprising the following steps:

providing a first packed tower aerator with an air inlet and outlet and a water inlet and outlet and a first mass transfer media stage;

spraying contaminated water from the water inlet over the first mass transfer media stage whereby the water is brought into contact with the transfer media;

forcing air from the air inlet through the first mass transfer media stage such that the forced air comes into contact with the water, the air-water contact causing contaminants within the water to be transferred to the forced air;

gathering the forced air and directing it through the outlet;

providing a second packed tower aerator with an air inlet and outlet and a water inlet and outlet and a second mass transfer media stage;

directing the air from the outlet of the first packed tower aerator to the inlet of the second packed tower aerator, and further directing the air from the inlet of the second packed tower aerator through the second mass transfer media stage.

3. A method for reutilizing process air in a packed tower aeration system, the method comprising the following steps:

providing a first aerator with an air inlet and outlet;

aerating contaminated water within the first aerator by forcing air from the inlet to the outlet;

providing a second aerator with an air inlet and outlet;

directing the air from the outlet of the first aerator to the inlet of the second aerator, wherein the air is again used to aerate contaminated water.

4. The method as described in claim 3 wherein the aeration within the first aerator is carried out within a volume of a mass transfer media.

5. The method as described in claim 3 wherein the aeration within the first aerator is carried out in multiple stages and wherein the pH of the water is adjusted between stages.

6. The method as described in claim 3 wherein the aeration within the second aerator is carried out in multiple stages and wherein the pH of the water is adjusted between stages.

7. An aeration tower for removing hydrogen sulfide from a water supply, the aeration tower comprising:
- a housing having upper and lower extents, a water inlet and an air outlet at the upper extent and a water outlet and an air inlet at the lower extent;
- a first pair of grated supports positioned adjacent to the upper extent of the housing, a first volume of mass transfer media positioned between the grated supports;
- a series of liquid distribution systems positioned above the first pair of grated supports, the distribution systems coupled to the water inlet and functioning to spray water from the inlet over the first volume of mass transfer media;
- a first water tray positioned beneath the first pair of grated supports, the water tray functioning to collect water after it passes through the first mass transfer media;
- a pH sensor for detecting the pH of the collected water;
- a second pair of grated supports positioned beneath the first water tray, a second volume of mass transfer media positioned between the grated supports;
- a series of liquid distribution systems positioned above the second pair of grated supports, the distribution systems coupled to the first water tray and functioning to spray water from the water tray over the second volume of mass transfer media;
- a second water tray located beneath the second pair of grated supports, the water tray functioning to collect water after it passes through the second mass transfer media and route it to the water outlet;
- an air channel allowing air from the air inlet to be forced through the first and second volumes of mass transfer media and through the air outlet.

8. A multi-stage aeration tower for removing contaminants from a water supply, the aeration tower comprising:
- a housing having first and second extents, a water inlet and an air outlet at the first extent and a water outlet and an air inlet at the second extent;
- a first volume of mass transfer media positioned adjacent the first extent of the housing;
- a pH sensor operatively positioned beneath the first volume of mass transfer media for detecting the pH of the water;
- a second volume of mass transfer media positioned beneath the first volume of mass transfer media;
- an air channel allowing air from the air inlet to be forced through the first and second volumes of mass transfer media and through the air outlet; a water channel allowing water from the water inlet to travel through the first and second volumes of mass transfer media and through the water outlet, wherein the air and water interact to aerate the water and remove contaminants.

9. The multi-stage aeration tower as described in claim 8 wherein the first and second volumes of mass transfer media are contained between grated supports.

10. The multi-stage aeration tower as described in claim 8 wherein the water inlet and air outlet are located at an upper extent of the housing and wherein the water flows through the first and second volumes of mass transfer media under the power of gravity.

11. A packed tower aerator system that permits outlet air to be reutilized, the system comprising:
- a first housing having upper and lower extents, a water inlet and an air outlet at the upper extent and a water outlet and an air inlet at the lower extent;
- a pair of grated supports positioned within the first housing, a volume of mass transfer media positioned between the grated supports;
- a series of liquid distribution systems positioned above the pair of grated supports, the distribution systems coupled to the water inlet and functioning to spray water from the inlet over the volume of mass transfer media;
- a tray for collecting the water after is passes through the mass transfer media, the tray functioning to route the collected water to the water outlet;
- an air channel allowing air from the air inlet to be forced through the volume of mass transfer media and through the air outlet;
- a second housing having upper and lower extents, a water inlet and an air outlet at the upper extent and a water outlet and an air inlet at the lower extent, wherein the air outlet of the first housing is coupled to the air inlet of the second housing;
- a pair of grated supports positioned within the second housing, a volume of mass transfer media positioned between the grated supports;
- an air channel within the second housing, the air channel allowing air from the air inlet to be forced through the volume of mass transfer media and through the air outlet.

12. A packed tower aerator system that permits outlet air to be reutilized, the system comprising:
- a first housing having a water inlet and outlet and an air inlet and outlet;
- a volume of mass transfer media positioned within the first housing;
- an air channel allowing air from the air inlet to be forced through the volume of mass transfer media and through the air outlet;
- a water channel allowing water from the inlet to be passed over the volume of mass transfer media wherein it is aerated by the air channel;
- a second housing having a water inlet and outlet and an air inlet and outlet, wherein the air outlet of the first housing is coupled to the air inlet of the second housing;
- a volume of mass transfer media within the second housing;
- an air channel within the second housing, the air channel allowing air from the air inlet to be forced through the volume of mass transfer media and through the air outlet.

13. The system as described in claim 12 wherein the first and second housings are connected in series with one another.

14. The system as described in claim 12 further comprising a third housing with an air inlet and outlet and wherein the air outlet of the second housing is coupled to the air inlet of the third housing.

15. The system as described in claim 12 further comprising an odor control system at the air outlet of the second housing.

* * * * *

UNITED STATES PATENT AND TRADEMARK OFFICE
CERTIFICATE OF CORRECTION

PATENT NO. : 7,282,081 B2
APPLICATION NO. : 10/960446
DATED : October 16, 2007
INVENTOR(S) : John A. Verscharen It is certified that error appears in the above-identified patent and that said Letters Patent is hereby corrected as shown below:

Column 5, line 40, delete ($HS^+$) and insert ($HS^-$)

Column 6, line 2, delete $HCO_3$— and insert $HCO_3^-$

Column 6, line 6, delete $HCO_3$— and insert $HCO_3^-$

Signed and Sealed this

Eighth Day of July, 2008

JON W. DUDAS
*Director of the United States Patent and Trademark Office*